(12) United States Patent
Aron et al.

(10) Patent No.: US 12,066,803 B2
(45) Date of Patent: Aug. 20, 2024

(54) APPARATUS AND METHOD FOR ITERATIVELY AND INTERACTIVELY PLANNING AN I/O STATION FOR AN AUTOMATION CONTROLLER

(71) Applicant: PHOENIX CONTACT GMBH & CO. KG, Blomberg (DE)

(72) Inventors: Ralf Aron, Detmold (DE); Frank Konieczny, Lemgo (DE); Dietmar Krumsiek, Emmerthal (DE); Burkhard Werner, Schlob Holte-Stukenbrock (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 564 days.

(21) Appl. No.: 17/289,446

(22) PCT Filed: Oct. 18, 2019

(86) PCT No.: PCT/EP2019/078333
§ 371 (c)(1),
(2) Date: Apr. 28, 2021

(87) PCT Pub. No.: WO2020/088950
PCT Pub. Date: May 7, 2020

(65) Prior Publication Data
US 2021/0397151 A1    Dec. 23, 2021

(30) Foreign Application Priority Data
Oct. 31, 2018 (BE) ................................. 20185767

(51) Int. Cl.
*G05B 19/042* (2006.01)
*G06F 13/40* (2006.01)

(52) U.S. Cl.
CPC ..... *G05B 19/0423* (2013.01); *G06F 13/4068* (2013.01); *G05B 2219/21012* (2013.01); *G05B 2219/23258* (2013.01)

(58) Field of Classification Search
CPC ............................ G05B 19/0423; G06F 13/40
See application file for complete search history.

(56) References Cited

U.S. PATENT DOCUMENTS

| 5,056,001 A | 10/1991 | Sexton |
| 2005/0188351 A1* | 8/2005 | Hoefler ..................... G06F 8/20 |
| | | 717/106 |

(Continued)

OTHER PUBLICATIONS

Search Report. Belgium. For application BE201805767. Mailed on Jul. 12, 2019. With translation. 19 pages.

(Continued)

*Primary Examiner* — Mark A Connolly
(74) *Attorney, Agent, or Firm* — QUARLES & BRADY LLP

(57) ABSTRACT

The present invention relates to an apparatus for iterative and interactive scheduling of an I/O station for an automation control system. The apparatus includes a selection device adapted to specify a selection of signals for the I/O station in the form of (i) signal data and (ii) planning data for the I/O station based on user input. The apparatus also includes a database device adapted to provide property data for a plurality of I/O devices and I/O systems and a configuration device adapted to determine, based on the signal data, the planning data, and the property data, a system configuration for the I/O station that includes at least one I/O device among the plurality of I/O devices. The configuration device is further adapted to perform a technical check of the specific construction rules of the respective I/O system of the system configuration and to change the system configuration in case of failure of the technical check. The apparatus (Continued)

also includes a display device adapted to display the system configuration for the I/O station.

15 Claims, 3 Drawing Sheets

(56) References Cited

U.S. PATENT DOCUMENTS

| | | |
|---|---|---|
| 2008/0114902 A1 | 5/2008 | Leong |
| 2011/0191500 A1 | 8/2011 | Odayappan et al. |
| 2012/0290759 A1 | 11/2012 | Blair |
| 2014/0039656 A1 | 2/2014 | Humpert et al. |
| 2014/0195126 A1* | 7/2014 | Prickel .................. A01B 71/02 701/50 |
| 2015/0177708 A1* | 6/2015 | McDonald ......... G05B 19/0423 700/52 |
| 2016/0342720 A1* | 11/2016 | Veneris .................. G06F 30/30 |
| 2017/0227944 A1 | 8/2017 | Goli et al. |
| 2017/0364045 A1 | 12/2017 | Mohammed Siddique |
| 2018/0210428 A1 | 7/2018 | Jundt et al. |

OTHER PUBLICATIONS

International Searching Authority. International Search Report and Written Opinion for application PCT/EP2019/078333. Mailed on Dec. 20, 2019. With translation. 23 pages.

\* cited by examiner

APPARATUS AND METHOD FOR ITERATIVELY AND INTERACTIVELY PLANNING AN I/O STATION FOR AN AUTOMATION CONTROLLER

CROSS-REFERENCE TO RELATED APPLICATIONS

This application is a U.S. National Phase of International Application No. PCT/EP2019/078333 filed Oct. 18, 2019 which claims the benefit of priority to Belgian Application No. BE20185767 filed on Oct. 31, 2018, which are herein incorporated by reference in their entirety.

TECHNICAL FIELD

The present invention relates to systems for an I/O station design and project planning.

In particular, the present invention relates to a device and a method for iterative and interactive configuration of an I/O station for an automation control system.

TECHNICAL BACKGROUND

Known software systems for the construction of modular I/O systems, such as the TIA Selection Tool or the Bus Configurator in PLCnext Engineer, are limited to the observance of rules and dependencies in order to check a complete construction of the I/O station, free of errors with respect to the components required for the construction of the station.

In these software tools, however, the selection of the components to be used for setting up the I/O station is always made by the user of the software, e.g. by selecting the component to be used from a correspondingly displayed product catalog, preferably in a tree-oriented view.

To facilitate mass input, the number of components to be inserted or the number of channels required to connect the peripherals can be specified at this point, if necessary.

SUMMARY OF THE INVENTION

It is a task and object of the present invention to provide an improved device an improved method for projecting and project planning of an I/O station for an automation control system.

This task is solved by the objects of the independent patent claims. Further embodiments and embodiments can be found in the dependent patent claims, the description and the figures of the drawings.

A first aspect of the present invention relates to an apparatus for iterative and interactive configuration and project planning of an I/O station for an automation control system, the apparatus comprising a selection device, a database device, a configuration device and a display device.

The selection device is adapted to determine a selection of signals for the I/O station in the form of signal data and planning data for the I/O station based on a user input.

The database device is adapted to provide property data for a plurality of I/O devices and I/O systems.

The configuration device is adapted to determine, based on the signal data, the planning data, and the property data, a system configuration for the I/O station that includes at least one I/O device among the plurality of I/O devices, wherein the configuration device is further adapted to perform a technical check or test of the specific design rules of the respective I/O system of the system configuration and to change the system configuration in case of a failure of the technical check or test.

The display device is adapted to display the system configuration for the I/O station.

The present invention enables a user to be supported interactively and thus particularly productively in an iterative procedure during the project planning—the project planning includes, for example, compilation and design—of a modular I/O station. This includes the generation of a possible implementation of the overall system of the modular I/O station from a multitude of I/O modules just by selecting and describing the I/O signals to be connected to the I/O station, without the user himself having to have knowledge about the I/O devices and their properties.

The configured I/O station is used, for example, in the environment of industrial controllers, such as automation technology controllers or also programmable logic controllers, PLCs, which serve to automate machine or process engineering sequences.

The interactive support of the tool is designed in such a way that the tool determines a functioning solution with just a few simple entries from the user and visualizes it directly, for example, immediately after data entry. For example, the tool assumes typical values for those parameters that the user has not yet specified and supplements the user's information in this way.

In the visualized solution, the tool displays all the parameters of the I/O station that have been entered so far and, if necessary, also the supplemented parameters, thereby prompting the user to further specify his information by changing and adapting the values of the supplemented parameters according to his requirements.

Each additional specification from the user is acknowledged by the tool, for example, directly with the revision and/or a redetermination of the I/O station and thus supports the user in iteratively and interactively adapting the I/O station more specifically to his application or the respective application.

In other words, the present invention makes it possible to iteratively and interactively guide the user to an I/O station that is better adapted to the application—the adapted I/O station represents the customized solution for his specific system request.

Advantageously, the present invention enables direct editing and renewed presentation of the modified station design in response to user input.

Thus, the present invention comprises input-accompanying structural checks of setup rules of the I/O system, e.g., current calculations or infrastructure components are continuously checked when the station setup is created.

The present invention further comprises output-assisted and user interaction-based structural checks of setup or design rules of the I/O system.

Advantageously, the present invention enables direct feedback to the user on the projected I/O signals during data input and/or data output.

Advantageously, the present invention enables the specific connection scenario of the connected peripherals—sensors, actuators or processing units—to be defined by different types of I/O signals.

In other words, the present invention makes it possible to generate and complete the concrete station setup already at the initial data input stage in order to speed up the planning of the system, so that a device selection made directly influences in turn the selection of I/O signals.

Further, advantageous embodiments of the present invention can be seen in the dependent claims.

In an advantageous exemplary embodiment of the present invention, it is further provided that the selection device is adapted to perform the user input as an interactive data input.

In an advantageous exemplary embodiment of the present invention, it is further provided that the configuration device is designed to repeatedly—for example by programming loop or triggered by user input or continuously—determine a working solution for the I/O station during the user input. This advantageously enables an iterative interaction process with the user to be provided.

In an advantageous exemplary embodiment of the present invention, it is provided that the selection device is further adapted to complete parameters not specified by the data input by supplemented parameters—also referred to as default parameters. These supplemented parameters are default values with values usual for the respective application. This enables a functional solution to be found immediately for each interaction of the user.

In an advantageous exemplary embodiment of the present invention, it is provided that the display device is further configured to display the default parameters supplemented for the selection of the user.

In an advantageous exemplary embodiment of the present invention, it is provided that the user input in the form of interactive data input supports a plurality of individual data changes.

In an advantageous exemplary embodiment of the present invention, it is provided that the configuration device is adapted to perform a revision of the system configuration for the I/O station after each individual data change.

In an advantageous exemplary embodiment of the present invention, it is provided that the database device is further adapted to provide property data for a plurality of sensor devices, actuator devices, switching devices, amplifier devices, control devices, interface devices, or bus coupling devices.

In an advantageous exemplary embodiment of the present invention, it is provided that the configuration device is further adapted to determine the I/O station comprising at least one I/O device or switching device or amplifier device or control device or interface device or bus coupling device from the plurality of I/O devices, switching devices, amplifier devices, control devices, interface devices, or bus coupling devices.

In an advantageous exemplary embodiment of the present invention, it is provided that the property data of an I/O device matches at least one connection scenario of a signal type among the plurality of I/O devices.

In an advantageous exemplary embodiment of the present invention, it is further provided that the signal data of a connection scenario to at least one signal type among the plurality of signal types provided matches the property data of an I/O device.

In an advantageous embodiment of the present invention, it is provided that the configuration device is configured to determine the system configuration for the I/O station based on a comparison of the property data of the connection scenarios selected for an I/O station by the user with the property data of the I/O devices.

In an advantageous embodiment of the present invention, it is provided that the selection device is further adapted to determine basic setting data and/or frame condition data of the I/O station for the determined system configuration of the I/O station.

In an advantageous embodiment of the present invention, it is provided that as the basic setting data of the I/O station, a control type, a performance class, a programming system are set by the selection device.

In an advantageous embodiment of the present invention, it is provided that as the basic setting data of the I/O station, the temperature range for the operation of the I/O station, a dimension range for the construction of the I/O station, a humidity range for the operation of the I/O station, a mass range for the construction of the I/O station, a voltage range or a current range for the connection of the I/O station, required approvals for the selection of the devices are set by the selection device.

In a second aspect of the present invention, there is provided a method for iteratively and interactively designing and project planning an I/O station for an automation control system of an article, the method comprising the following method steps:

As a first step of the method, a selection of signals for the I/O station in the form of (i) signal data and (ii) planning data for the I/O station is determined based on a user input by means of a selection device.

As a second step of the method, property data for a plurality of I/O devices and I/O systems is provided by means of a database device or database facility.

As a third step of the method, a system configuration for the I/O station is determined based on the signal data, the planning data and the property data by means of a configuration device, wherein the system configuration comprises at least one I/O device from the plurality of I/O devices, wherein further a technical check of the specific design rules of the respective I/O system of the system configuration is performed by the configuration device and in case of a failure of the technical check the system configuration is changed.

As a fourth step of the method, a display of the system configuration for the I/O station is performed by means of a display device.

The method of the present invention advantageously enables the interactively guided simulation of I/O stations in the designing and planning process of the automation technology equipment of a plant, machine or process technology facility.

In an advantageous embodiment of the present invention, it is provided that as the user input an interactive data input is performed by the selection device, and wherein during the user input a working solution for the I/O station is determined by the configuration device.

In an advantageous exemplary embodiment of the present invention, it is provided that unspecified parameters are added by the user data input and assigned default values by the selection device, and the values of all parameters are displayed by the display device.

In an advantageous exemplary embodiment of the present invention, it is provided that the user input in the form of the interactive data input has a plurality of individual data changes and, after each individual data change, a revision of the system configuration for the I/O station is performed by the configuration device.

In an advantageous exemplary embodiment of the present invention, the property data for a plurality of sensor devices, actuator devices, switching devices, amplifier devices, control devices, interface devices, or bus coupling devices is provided by the database device.

In a third aspect of the present invention, there is provided a computer program or computer program product comprising instructions which, when the program is executed by a computer, cause the computer to perform the steps of the method for iteratively and interactively configuring from an I/O station for an automation control system in accordance with the second aspect of the present invention.

In a fourth aspect of the present invention, there is provided a computer-readable (storage) medium comprising instructions which, when executed by a computer, cause the computer to execute the steps of the method for iterative and interactive configuration of an I/O station for an automation control system in accordance with the second aspect of the present invention.

The described embodiments and further embodiments can be combined with each other as desired.

Other possible embodiments, further embodiments and implementations of the present invention also include combinations of features of the present invention described previously or hereinafter with respect to the embodiments that are not explicitly mentioned.

The accompanying drawings are intended to provide a further understanding of embodiments of the present invention.

The accompanying drawings illustrate embodiments and, in connection with the description, serve to explain concepts of the present invention.

Other embodiments and many of the advantages mentioned will be apparent with reference to the figures of the drawings. The elements shown in the figures of the drawings are not necessarily shown to scale with respect to each other.

BRIEF DESCRIPTION OF THE FIGURES

Showing.

DETAILED DESCRIPTION OF THE EMBODIMENTS

In the figures of the drawings, identical reference signs designate identical or functionally identical elements, parts, components or process steps, unless otherwise indicated.

Figure 1:
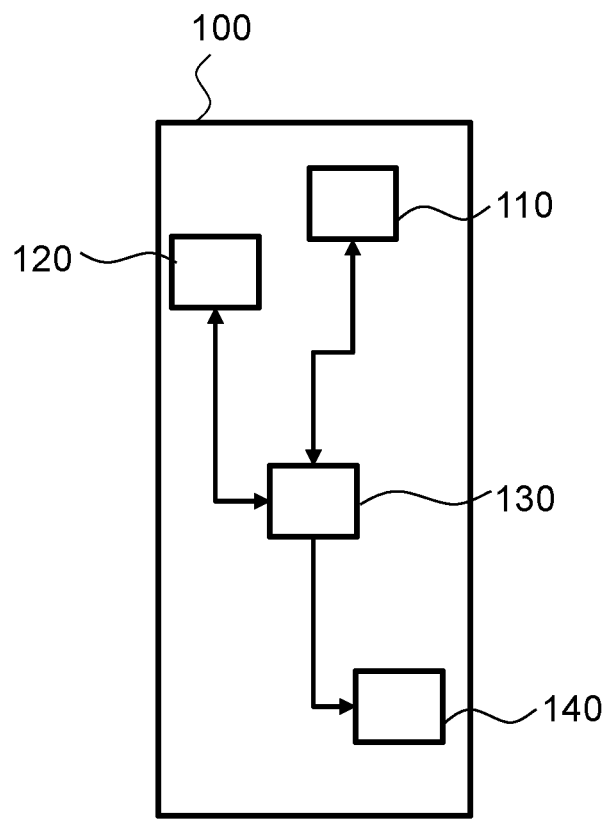
FIG. 1: a schematic representation of a device for iterative and/or interactive project planning from an I/O station for an automation control system according to an embodiment of the present invention.

FIG. 1 shows a schematic representation of a device or an apparatus for iterative and/or interactive configuration or project planning of an I/O station for an automation control system according to an embodiment of the present invention.

The apparatus 100 comprises a selection device 110, a database device 120, a configuration device 130, and a display device 140.

The apparatus 100 is configured to interactively and thereby particularly productively support a user in configuring a modular I/O station with an iterative approach.

The device 100 is designed to determine or re-determine and display the project planning, i.e. the compilation and design, simultaneously with the data input in a continuous manner. This is done by continuously updating the calculated and displayed modular design of the I/O station, and the respective system configuration may also be referred to as the solution to the system requirements requested by the user.

According to one embodiment of the present invention, for example, it is envisaged that the I/O station is used in the environment of industrial control systems automation technical control, abbreviated PLC, English: Programmable Logic Controller, PLC, which serve to automate machine or process sequences.

According to one embodiment of the present invention, the interactive support of the device 100 is designed in such a way that the user interface determines a working solution even with minimal indications from the user and visualizes it directly, in time, i.e. immediately after the indication, on a graphical user interface or graphical user interface.

Thereby, according to an embodiment example of the present invention, the device 100 is further adapted to assume typical parameter values of the I/O station structure for further parameters that the user has not yet specified. In this context, the assumed parameter values may be adapted to other parameters already entered.

The device 100 comprises a display device 140, which is designed to display the parameters and, if necessary, to prompt the user by means of indications to specify further parameters and to specify them by means of a further user input made in response to the indication.

According to one embodiment of the present invention, the device 100 is adapted to respond to each additional indication from the user directly by revising or re-determining the I/O station in the form of an updated solution. This assists the user to adapt the I/O station more and more specifically to his application or to his particular application.

In this regard, the device 100 is further configured, for example, to iteratively guide the user to an I/O station or solution that is better adapted to the application, step by step.

The selection device 110 is adapted to determine a selection of signals for the I/O station in the form of (i) signal data and (ii) planning data for the I/O station based on a user input.

The database device 120 is adapted to provide property data for a plurality of I/O devices and I/O systems.

The configuration device 130 is configured to determine, based on the signal data, the planning data, and the property data, a system configuration for the I/O station that includes at least one I/O device from the plurality of I/O devices.

The configuration device 130 is adapted to perform a technical check of the specific design rules of the respective I/O system of the system configuration, and to change the system configuration if the technical check is not passed.

The technical check or technical test of the specific design rules of the respective I/O system comprises, for example, that if a technically correct implementation of the entered planning and property data is not possible, the values of the planning and property data are reset.

The display device 140 is configured to display the system configuration for the I/O station.

The apparatus 100 enables the product selection to be provided as a functionality, this enables any user to use the respective product portfolio even without any special prior knowledge in order to build up a functional system configuration according to the respective systemic project planning rules.

The apparatus 100 makes it possible to use the selection via types of I/O signals and the own manual selection of devices in an integrated way.

The apparatus 100 enables the inputs and displays relevant to a user when creating an I/O station, even if they occur in separate processing steps, to be integrated into a user interface.

The device apparatus 100 enables, via an integrated user interface, any response of the system to an interaction of the user to be immediately visible to the user.

Figure 2:
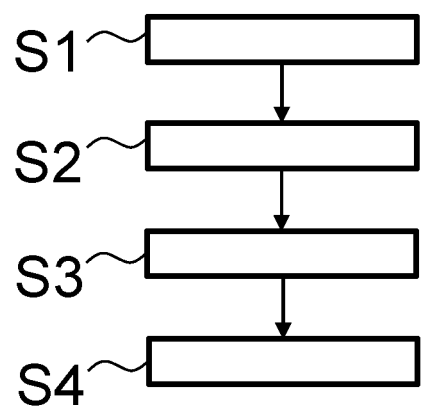
FIG. 2: a schematic representation of a flow chart of a method for iterative and/or interactive configuration of an I/O station for an automation control system according to an embodiment of the present invention.

FIG. 2 a schematic diagram of a flowchart of a method for iterative and/or interactive configuration of an I/O station for an automation control system according to an embodiment of the present invention.

As a first step of the method, a selection S1 of signals for the I/O station in the form of (i) signal data and (ii) planning data for the I/O station is determined based on a user input by means of a selection device.

As a second method step, property data for a plurality of I/O devices and I/O systems is provided S2 by means of a database device.

As a third method step, a system configuration for the I/O station is determined S3 based on the signal data, the planning data and the property data by means of a configuration device, wherein the system configuration comprises at least one I/O device from the plurality of I/O devices, wherein a technical check of the specific design rules of the respective I/O system of the system configuration is further carried out by the configuration device and the system configuration is changed in case of a failure of the technical check.

As a fourth method step, a display S4 of the system configuration for the I/O station is performed by means of a display device.

Figure 3:
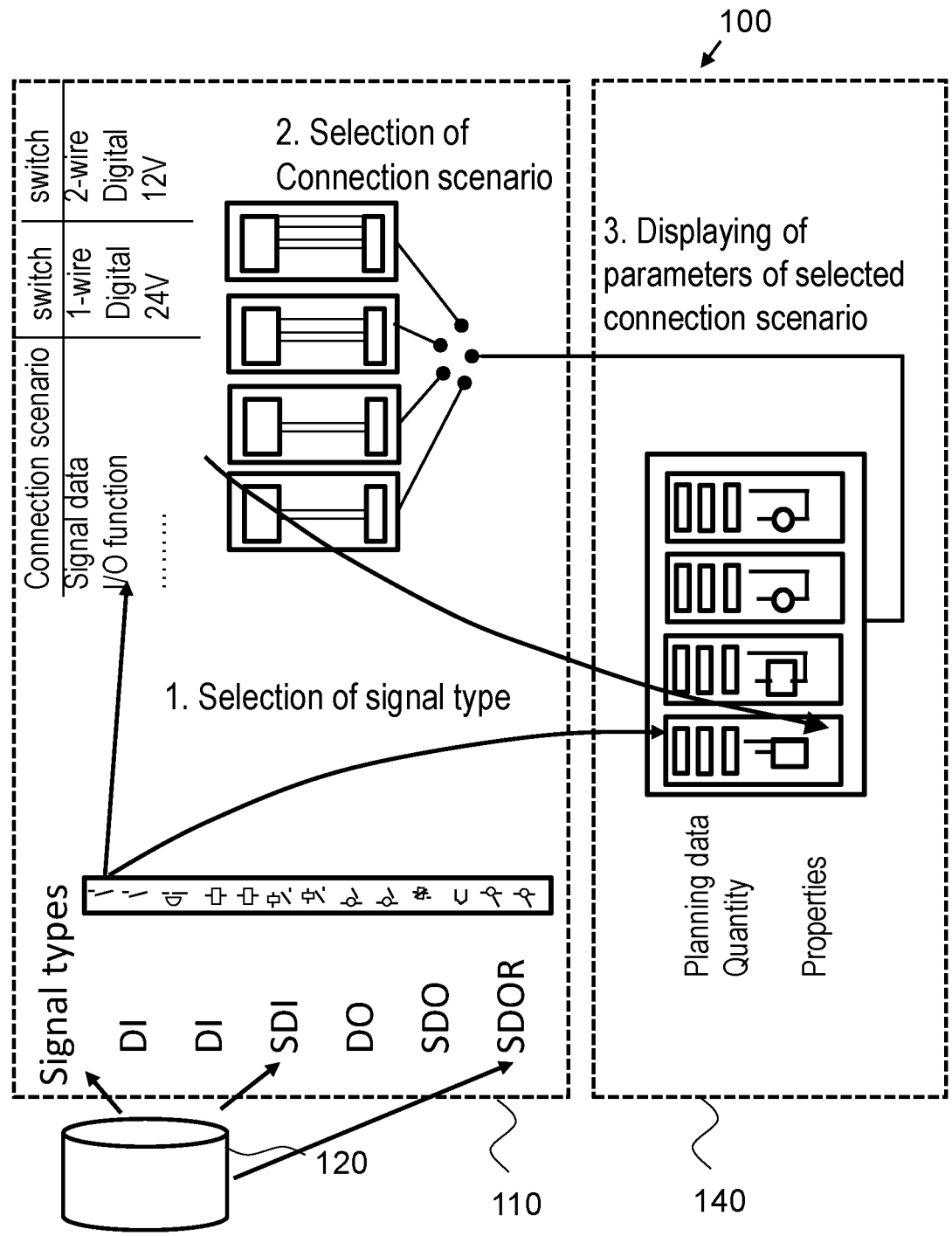
FIG. 3: A schematic representation of a process visualization of a method for iterative and/or interactive configuration of an I/O station for an automation control system according to an embodiment of the present invention.

FIG. 3 illustrates the interacting processes between the selection device 110, the database device 120, and the display device 140, wherein the configuration device also contributes to changing the system configuration.

The method for iteratively and/or interactively configuring an I/O station for an automation control system is a software tool whose core function is to assist in configuring I/O stations as part of the automation of a plant, machine or property.

Users of the tool are therefore people with a sound knowledge of automation technology on the one hand and the functions to be automated or the process to be automated on the other side. However, the users predominantly have only a limited knowledge of the automation components, in particular their specific characteristics, individual functions and their systemic project planning rules for the construction of a concrete I/O station from its individual components.

The actual task of an I/O station is to connect the sensors and actuators of a plant, machine or property to the respective automation system. Therefore, the starting point for the project planning of an I/O station with the method are the signals from the sensors to be detected and to the actuators to be controlled, which are to be connected via an I/O station.

In an exemplary embodiment of the present invention, it can still be specified here via which network or fieldbus system the station is to be connected or whether the station itself is to be implemented as a controller.

The definition of a signal type is done by a set of attributes, an example herewith is for instance the signal "binary input signal −24 V DC, +switching".

On the basis of this planning information, the process independently determines the products that optimally match the task described in this way in terms of function and price, and then uses these components to create a technically correct station configuration.

The resulting station configuration is thus an illustration or translation of the described tasks from the customer application to be planned.

The procedure visualizes this for the user by comparing the configured signals of the sensors and actuators as well as the resulting selection of components in a station configuration according to the configuration rules.

If the user selects devices himself on the basis of his knowledge and inserts them into the station structure in order to rework, supplement or even completely individually construct a generated station, the method generates corresponding signals on the side of the sensors/actuators to be connected, which in turn map the configuration information for these manually selected devices.

According to an embodiment example of the present invention, the signal serves as a central reference object for the calculation of the station setup. An example of this is a temperature sensor that is connected to an automation system via the signal type "analog input"—this relationship between the temperature sensor on one side and the analog input on the other is referred to as the connection scenario.

The connection scenario describes the context of the specific task, e.g. measuring the temperature of a liquid in a tank. The attributes of a signal type define a set of characteristic properties for identifying a connection scenario.

The connection scenario is therefore very specific and can only be named meaningfully with knowledge of the respective application. For this purpose, the identifier of the signal can be used, i.e. specifically overwritten.

Example element for the attributes of a signal type are as follows:

Attributes
I/O-Function read-only
ConnectionTechnology read-only
Logic read-only
Signal read-only
InputCharacteristic—
SurgeResistant read-only
SensorCurrent—

The read-only properties are used to determine a specific connection scenario via its characteristic values. The display area shown in FIG. 3 visualizes the determined connection scenario structure in schematic form for the user.

For each selected connection scenario, a characteristic sensor/actuator symbol is displayed in the display area for the user to visualize. A connection scenario describes the entire path from the sensor/actuator in the machine, plant or property to the connections, terminal points, of the I/O module with the I/O function behind it. This connection is represented by the sensor/actuator symbol.

The procedure offers the user in each case all available connection scenarios for the project engineering of signals. All displayed connection scenarios are technically possible.

A connection scenario defines a concrete realization of a signal. The possible connection scenarios of a signal are the variants that the user can use when configuring an I/O station.

The connection scenario—describes concretely how the signal of a sensor or actuator is connected to a device in the I/O station from the perspective of electrical design.

The procedure offers the user, for example, different options, also variants, how the connection of a signal can be realized.

The core function is the design of an I/O station. This is done by defining the signals that are needed at this point of a machine, plant or property to connect the sensors and actuators to the I/O station.

After the selection for creating a new project on the start screen, the procedure changes, for example, directly to the station view, the station view is the workstation for planning and editing an I/O station, i.e. an input and output interface for basic setting data and the frame condition data of the I/O station is provided. An entire project may include multiple stations.

According to an embodiment example of the present invention, it is provided that a tool-guided planning of an I/O station is performed. The definition of the connection scenarios that can be used for the project planning is in a common database of the database facility comprising all I/O stations. This database contains a large number of connection scenarios as templates with which the user can describe the signals to be connected to an I/O station.

The user is only offered connection scenarios as templates for which devices are available with the current settings for this station. Each connection scenario stands alone with its attributes, so there is no hierarchy or other form of dependencies between the connection scenarios.

Although the present invention has been described above with reference to preferred embodiments, it is not limited thereto, but can be modified in a variety of ways. In particular, the invention can be changed or modified in a variety of ways without departing from the essence of the invention.

Additionally, it should be noted that "encompassing" and "comprising" do not exclude other elements or steps, and "one" or "a" do not exclude a plurality.

The invention claimed is:

1. An apparatus for iteratively and interactively project planning an I/O station for an automation control system, the apparatus comprising:
a selection device adapted to determine a selection of signals for the I/O station in the form of (i) signal data and (ii) planning data for the I/O station based on user input;
a database device adapted to provide property data for a plurality of I/O devices and I/O stations;
a configuration device adapted to determine, based on the signal data, the planning data, and the property data, a system configuration for the I/O station that includes at least one I/O device among the plurality of I/O devices, wherein the configuration device is further adapted to perform a technical check of the specific construction rules of the respective I/O station of the system configuration and to change the system configuration in case of failure of the technical check; and
a display device adapted to display the system configuration for the I/O station.

2. The apparatus according to claim 1, wherein the selection device is adapted to perform an interactive data entry as the user input, and wherein the configuration device is adapted to determine a working solution for the I/O station during the user input.

3. The apparatus according to claim 1, wherein the selection device is further adapted to supplement parameters not specified by the data input with default parameters, and wherein the display device is further adapted to display the values of all parameters.

4. The apparatus according to claim 1, wherein the user input in the form of the interactive data input comprises a plurality of individual data changes, and wherein the configuration device is adapted to perform a revision of the system configuration for the I/O station after each individual data change.

5. The apparatus according to claim 1, wherein the database device is further adapted to provide property data for a plurality of sensor devices, actuator devices, switching devices, amplifier devices, control devices, interface devices, or bus coupling device.

6. The apparatus according to claim 5, wherein the configuration device is further adapted to determine a system configuration for the I/O station comprising at least one I/O device or switching device or amplifier device or control device or interface device or bus coupling device from the plurality of I/O devices, switching devices, amplifier devices, control devices, interface devices, or bus coupling devices.

7. The apparatus according to claim 1, wherein the selection device is further adapted to determine basic setting data or framework condition data of the I/O station for the determined system configuration of the I/O station.

8. The apparatus according to claim 7, wherein as the basic setting data of the I/O station, a control type, a performance class or a programming system are set by the selection device; or
wherein as the framework condition data of the I/O station, a temperature range for the operation of the I/O station, a dimension range for the construction of the I/O station, a humidity range for the operation of the I/O station, a mass range for the construction of the I/O station, a voltage range or a current range for the connection of the I/O station or required approvals for the selection of the devices are set by the selection device.

9. An apparatus for iteratively and interactively project planning an I/O station for an automation control system, the apparatus comprising:
a selection device adapted to determine a selection of signals for the I/O station in the form of (i) signal data and (ii) planning data for the I/O station based on user input
a database device adapted to provide property data for a plurality of I/O devices and I/O stations;
a configuration device adapted to determine, based on the signal data, the planning data, and the property data, a system configuration for the I/O station that includes at least one I/O device among the plurality of I/O devices, wherein the configuration device is further adapted to perform a technical check of the specific construction rules of the respective I/O station of the system configuration and to change the system configuration in case of failure of the technical check:
a display device adapted to display the system configuration for the I/O station; and
wherein the property data further comprises at least one I/O function from an I/O device of the plurality of I/O devices, or wherein the signal data further comprises at least one I/O function of the signals.

10. The apparatus according to claim 9, wherein the configuration device is adapted to determine the system configuration for the I/O station based on a comparison of the property data of the connection scenarios selected for an I/O station by the user with the property data of the I/O devices.

11. A method of iteratively and interactively project planning an I/O station for an automation controller, the method comprising the steps of:
specifying a selection of signals for the I/O station in the form of (i) signal data and (ii) planning data for the I/O station based on user input by means of a selection device;

providing property data for a plurality of I/O devices and I/O stations by means of database device;

determining a system configuration for the I/O station based on the signal data, the planning data, and the property data by configuration device, the system configuration including at least one I/O device among the plurality of I/O devices, wherein a technical check of the specific design rules of the respective I/O station of the system configuration is further performed by the configuration device, and in case of failing the technical check, the system configuration is changed; and displaying the system configuration for the I/O station by means of a display device.

12. The method according to claim 11, wherein the user input is guided in the form of interactive data input from the selection device, and wherein during the user input a working solution for the I/O station is determined by the configuration device.

13. The method according to claim 11, wherein parameters not specified by the data input are completed and assigned default values by the selection device, and all parameters are displayed by the display device.

14. The method according to claim 11, wherein the user input in the form of the interactive data input comprises a plurality of individual data changes, and after each individual data change a revision of the system configuration for the I/O station is performed by the configuration device.

15. The method according to claim 11, wherein the property data for a plurality of sensor devices, actuator devices, switching devices, amplifier devices, control devices, interface devices, and bus coupling device is provided by the database device.

* * * * *